United States Patent [19]

Sturgill

[11] 3,956,134

[45] May 11, 1976

[54] UNDERDRAIN FOR WATER FILTRATION SYSTEM

[75] Inventor: James Raymond Sturgill, Charlotte, N.C.

[73] Assignee: Hi-Ran, Ltd., Charlotte, N.C.

[22] Filed: July 19, 1973

[21] Appl. No.: 380,988

[52] U.S. Cl. .............................. 210/275; 210/279; 210/293
[51] Int. Cl.² ........................................ B01D 23/18
[58] Field of Search ............ 210/80, 269, 274, 275, 210/279, 291, 292, 293

[56] References Cited
UNITED STATES PATENTS

| | | | |
|---|---|---|---|
| 1,572,076 | 2/1926 | Paterson .............................. | 210/291 |
| 2,378,239 | 6/1945 | Myron ................................. | 210/293 |
| 2,710,692 | 6/1955 | Kegel et al. .......................... | 210/274 |
| 3,468,422 | 9/1969 | Camp ................................... | 210/293 X |
| 3,613,888 | 10/1971 | Harris ................................. | 210/275 X |
| 3,869,391 | 3/1975 | Graveland et al. ................. | 210/291 X |

FOREIGN PATENTS OR APPLICATIONS

| | | | |
|---|---|---|---|
| 5,850 | 5/1906 | United Kingdom ................ | 210/292 |
| 15,049 | 10/1895 | United Kingdom ................ | 210/293 |
| 14,233 | 1/1926 | Netherlands ........................ | 210/291 |
| 298,867 | 5/1954 | Switzerland ........................ | 210/293 |
| 854,493 | 11/1960 | United Kingdom ................ | 210/293 |

Primary Examiner—Frank A. Spear, Jr.
Assistant Examiner—Robert G. Mukai
Attorney, Agent, or Firm—Bell, Seltzer, Park & Gibson

[57] ABSTRACT

An underdrain is provided in a water filtration system beneath a bed of filter media and comprises a plurality of elongate hollow underdrain units defining respective elongate substantially horizontal fluid passageways therein with the hollow underdrain units being arranged with the elongate fluid passageways thereof in fluid communication with each other and forming a network of fluid passageways beneath the bed of filter media. Each underdrain unit is provided with a plurality of nozzles in the upper wall thereof communicating with the interior of the hollow underdrain unit and with at least some of the nozzles in each underdrain unit cooperating with each other and being arranged in spaced groups. The cooperating nozzles in each group are so oriented as to direct streams of wash water issuing therefrom during backwashing into impingement with each other outside the filter underdrain unit for dispersing the streams of wash water and reducing the velocity thereof.

35 Claims, 15 Drawing Figures

UNDERDRAIN FOR WATER FILTRATION SYSTEM

This invention relates to an underdrain for a water filtration system, and more particularly to an underdrain for supporting a bed of filter media in an open gravity-type water filtration system.

Water filtration systems of the gravity type are commonly employed for filtering high volumetric flow rates of liquids, as for example, in municipal and industrial water treatment and waste treatment plants. The filtration system generally comprises one or more filters, each employing a bed of finely-divided granular filter media for filtering a liquid as it seeps downwardly through the filter bed.

Each filter in a conventional filtration system generally comprises an open filter basin having a floor and vertical walls surrounding the floor and an underdrain positioned over the floor to define a perforated false bottom in the basin for supporting the bed of filter media thereon and to provide a system of fluid passageways for removing the filtered water from the bottom of the filter basin. The bed of filter media is generally several feet deep and comprises successive layers of gravel and sand of graduated sizes, with a layer of relatively coarse gravel being provided at the bottom of the bed overlying the underdrain and with the layers of gravel and layers of sand being provided in progressively finer sizes toward the top of the bed. The uppermost layer usually comprises either extremely fine sand or finely granulated anthracite coal.

During operation of the filter, unfiltered water is provided in the filter basin to a depth of several feet above the upper layer of filter media and is allowed to flow downwardly through the bed of filter media where the suspended materials in the unfiltered water are trapped in the filter media. The water ultimately reaches the bottom of the filter bed where it passes through the perforations in the underdrain system, is collected in a system of fluid passageways beneath the bed of filter media, and is carried out of the filter basin through a suitable conduit.

After a number of hours of filtration, it becomes necessary to wash the bed of filter media in order to remove the material trapped therein. Washing of the filter media is accomplished by pumping water under pressure through the conduit in a reverse direction, into the system of fluid passageways in the underdrain system, and then upwardly through the perforations in the underdrain and into the overlying bed of filter media. The wash water flowing upwardly through the bed of filter media carries the trapped materials upwardly from the filter bed. The wash water and the materials entrained or suspended therein are then collected at the top of the filter basin and carried away.

During the backwashing operation it is desirable to obtain a uniform distribution of wash water throughout the bed of filter media in order to effect complete washing of the entire filter bed. If the wash water distribution is uneven so that dead spots occur at certain locations in the bed, then those portions of the filter bed will remain clogged, thereby reducing the efficiency of the filter. In many of the prior art filter underdrain systems, as for example those where the openings or perforations in the underdrain are oriented vertically, portions of the bed of filter media adjacent the walls and corners of the filter basin often remain clogged, since the wash water does not effectively reach these areas.

The backwashing operation must be performed under carefully controlled conditions to avoid unduly disturbing or damaging the bed of filter media. For example, the velocity of the wash water must be controlled at a level below that which would cause the filter media to become entrained in the wash water along with the removed materials and carried away as waste. In addition, care must be exercised to avoid opening channels or "blow holes" in the bed of filter media during the backwashing operation. Such blow holes may be formed by the force of the streams or columns of wash water through the filter bed during backwashing or by air which has become trapped in the underdrain and which is expelled upwardly in explosive bursts when the wash water is pumped into the underdrain at the initiation of the backwashing cycle. Blow holes are a serious problem since they create a channel in the bed of filter media through which water may pass without being filtered. Additionally, the blow holes permit the finely-divided filter media to pass downwardly into the underdrain and to be carried away in the stream of filtered water. Usually, the occurrence of blow holes in a filter bed requires reconditioning of the filter bed, wherein the filter media is removed, reclassified according to sizes, and replaced in the bed in layers. Obviously, this is a very expensive undertaking.

Accordingly, a number of attempts have been made in the prior art to overcome the problem of the formation of blow holes. For example, it has been proposed in McGivern U.S. Pat. No. 3,456,804 to provide the underdrain with various types of baffles on the upper surface thereof overlying the openings in the underdrain unit to deflect the flow of wash water leaving the underdrain and thereby minimize the disturbance of the overlying filter media. However, the use of baffles is undesirable since the baffles are generally of large size as compared to the openings with which they cooperate and require substantial spacing therebetween. Thus, the use of baffles reduces the number of openings which may be provided in the underdrain, limiting both the filtering capacity of the underdrain and also the wash water distribution thereof. Also, the use of baffles increases the head loss of the underdrain since the baffle interferes with the free flow of wash water from the underdrain during backwashing, causing the wash water to travel a tortuous path in leaving the underdrain. By increasing the head loss of the underdrain, the expense of pumping the wash water during the backwashing operation is increased. Additionally, since greater pressures are created within the underdrain during backwashing, any air trapped therein is expelled with greater force, thereby increasing the danger of forming blow holes.

With the foregoing in mind it is one of the primary objects of this invention to overcome the problem of forming blow holes in a bed of filter media during backwashing.

It is a further object of this invention to improve the distribution of wash water in a bed of filter media during backwashing to insure effectively washing all areas of the filter bed and to permit backwashing for shorter periods of time.

It is still another object of this invention to reduce the head loss of a filter underdrain during backwashing to provide more economical filter operation and to reduce the danger of damaging the overlying bed of filter media.

It is still another object of this invention to provide an underdrain for a water filtration system which is suitable for use either in new construction or for rehabilitating existing water filtration systems.

In accordance with this invention it has been found that the force of the water and air expelled from a filter underdrain during backwashing may be dissipated and the streams of water or air dispersed so as to reduce the danger of forming blow holes in an overlying bed of filter media by providing spaced groups of cooperating nozzles in the upper wall of a filter underdrain with the cooperating nozzles in each group being oriented so as to direct the streams of wash water issuing therefrom into impingement with each other. Thus, instead of the wash water being directed upwardly in a solid stream of column, it is dispersed by impingement with other streams of wash water and the velocity of the water is thereby reduced. Also, by providing groups of cooperating nozzles in accordance with the present invention, the distribution of wash water throughout the bed of filter media is improved, since the streams of wash water are deflected and dispersed rather than being directed upwardly in streams or columns as previously noted. By employing direct impingement by other streams for dispersing the wash water rather than the use of a baffle, and by providing a substantially straight flow path through the upper wall of the underdrain, the head loss of the underdrain is minimized.

More specifically, it has been found that the above objects may be accomplished by providing an underdrain for a water filtration system which comprises a plurality of elongate hollow underdrain units defining respective elongate substantially horizontal fluid passageways therein with the elongate hollow underdrain units being arranged with the fluid passageways thereof in fluid communication with each other and forming a network of elongate fluid passageways beneath the bed of filter media, and wherein each underdrain unit has an upper wall with a plurality of nozzles provided therein, with each of the nozzles defining a restricted fluid passageway extending along a substantially straight path through the upper wall and communicating with the elongate fluid passageway, and with at least some of the nozzles in each underdrain unit cooperating with each other and being arranged in spaced groups with the axes of the fluid passageways of the cooperating nozzles in each group intersecting each other at a point outside of and closely adjacent the underdrain unit so that the cooperating nozzles are thereby adapted for directing streams of wash water issuing therefrom during backwashing into impingement with each other for dispersing the streams of wash water and reducing the velocity thereof.

Some of the objects of the invention having been stated, other objects will appear as the description proceeds when taken in connection with accompanying drawings, in which.

Figure 1:
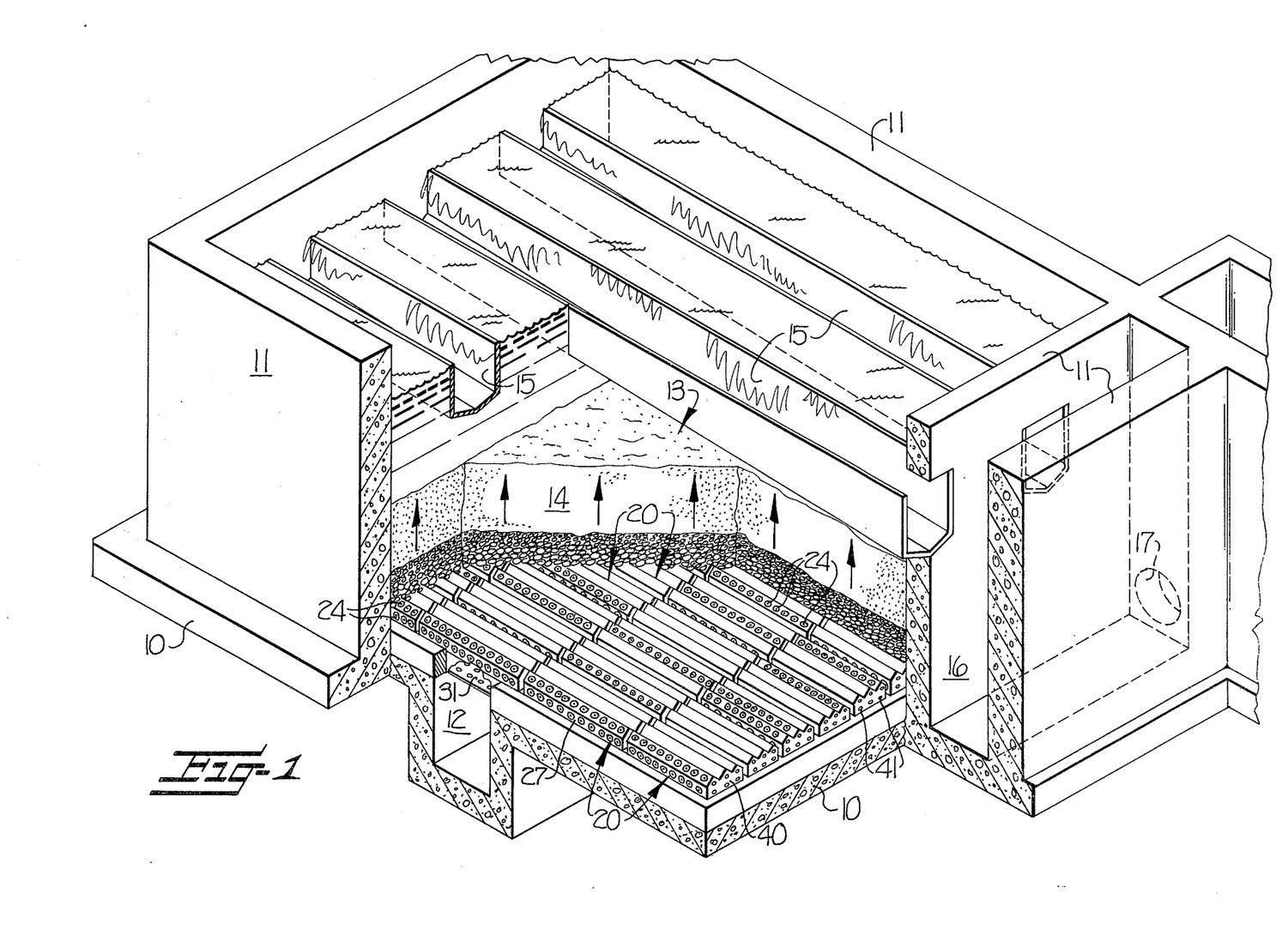
FIG. 1 is an isometric view, with parts broken away, of a gravity-type water filter employing an underdrain system in accordance with the present invention.

Referring now to FIG. 1, the filter illustrated therein includes a substantially horizontal floor 10, preferably of concrete, and walls 11, also of concrete, extending upwardly around the perimeter of floor 10 and defining an enclosed basin or crib. A recessed flume 12 is provided in floor 10 and extends across one dimension of the filter basin. An underdrain system is located over the floor 10 and comprises a large number of underdrain units 20 arranged in parallel adjacent rows and covering substantially the entire floor 10 of the filter basin. A bed of filter media, broadly designated at 13, is provided in the filter basin overlying the underdrain system and comprises successive layers of sand and gravel of graduated sizes. As illustrated, the lowermost layer is relatively coarse gravel of about 1 inch to 1½ inches in diameter. This layer is preferably positioned by hand to avoid damaging the underdrain units and to position the gravel primarily between the nozzles of the underdrain units so as to avoid obstructing the flow passageways thereof. After the first layer has been placed by hand, the remaining layers of gravel and sand may be poured into the basin to the desired depth. One or more additional layers of gravel are provided overlying the first layer, with each successive layer being of progressively finer size. These layers are provided primarily to provide a support for the uppermost layer 14 in the filter bed, which is preferably either fine sand or coal, and which serves to filter the water passing therethrough.

Extending longitudinally of the filter basin several feet above the filter media are a series of wash water troughs 15 which communicate at one end thereof with a discharge trough 16 feeding ultimately to a drain 17 for carrying away the wash water during the backwashing operation.

During filtration, unfiltered water is provided in the filter basin from the top thereof, passes downwardly through the filter bed 13, is collected in the network of fluid passageways formed by the underdrain units 20, and is carried away in flume 12. During periodic backwashing of the filter, as is illustrated in FIG. 1, wash water is supplied under pressure through flume 12, is delivered into the filter bed 13 through the openings in the upper wall of the underdrain units 20, passes upwardly through the bed of filter media as indicated by the arrows in FIG. 1, is collected in the wash water troughs 15 in the upper portion of the filter basin, and is carried away through drain 17.

Figures 2, 3:
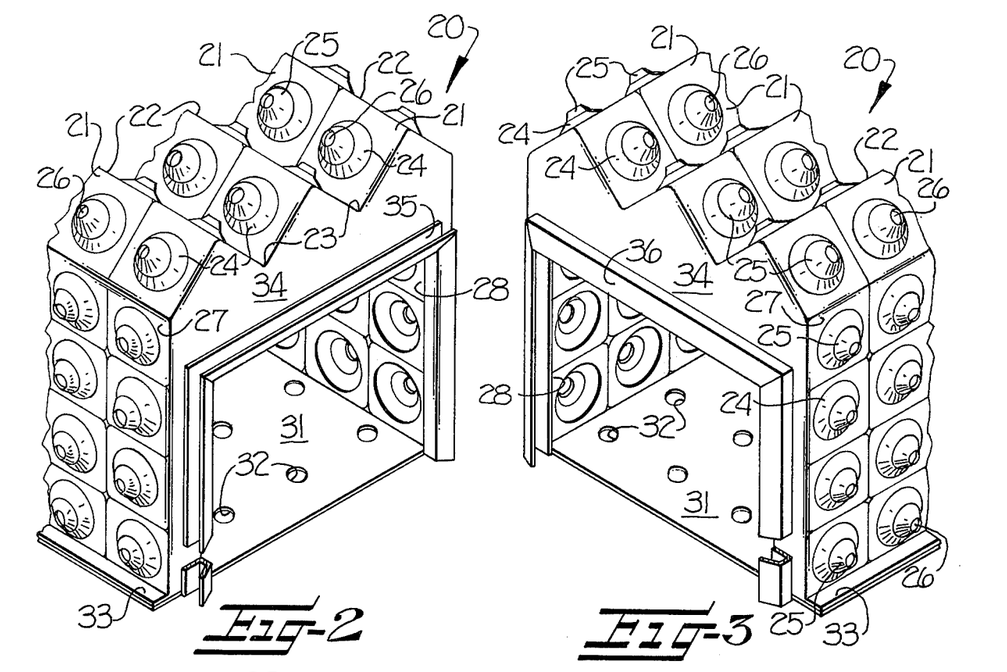
FIGS. 2 and 3 are partial isometric views of a pair of underdrain units adapted for being interconnected in end-to-end relation and showing the mating flanges at the end of each underdrain unit for effecting the interconnection.

Referring now to an individual underdrain unit 20, as best illustrated in FIGS. 2 and 3, the underdrain is of elongate, hollow, substantially box-like construction and is preferably formed of relatively thin-wall material, for example high impact plastic, carbon steel, steel alloy, stainless steel, or alloy aluminum. The upper wall 21 of underdrain unit 20 is preferably formed as an integral part of the underdrain unit and is of irregular construction, such as the zigzag or corrugated construction illustrated. As seen in FIGS. 2 and 3, underdrain units 20 are formed with a series of longitudinally extending substantially parallel peaks 22 and intervening valleys 23 therein defining a gabled or corrugated structure in the upper wall of the underdrain units which provides reinforcement to the upper wall and also increases the surface area thereof in contact with the overlying filter media. It will also be seen that the hollow box-like construction of each underdrain unit 20 defines a fluid passageway of substantial volume to facilitate the flow of wash water through the unit during backwashing. More particularly, the side walls of the unit have a height considerably greater than the amplitude or height of the peaks 22 in upper wall 21 so that the volume of the fluid passageway within the underdrain unit is many times greater than the volume collectively defined in the upper portion of the unit between the peaks and valleys of the upper wall.

A large number of nozzles with fluid passageways 26 therethrough are provided in the upper wall 21 of each underdrain unit for directing the wash water issuing from the underdrain unit during backwashing into streams and to orient the streams angularly upwardly from the upper wall 21 of the underdrain unit. As illustrated, the nozzles are in the form of open-ended tapered projections 24 having respective generally frusto-conical exterior surfaces and corresponding frusto-conical inner surfaces. The frusto-conical inner surfaces of the tapered nozzles illustrated serve to funnel the wash water into the fluid passageways of the nozzles during backwashing and thereby reduces the head loss of the underdrain unit during backwashing.

The nozzles are uniformly spaced apart in a grid-like arrangement over substantially the entire surface of upper wall 21 and form parallel rows of fluid passageways extending longitudinally of the underdrain unit. As illustrated, the respective rows of fluid passageways as defined by the nozzles are located intermediate each successive peak 22 and valley 23 on the upper wall of the underdrain unit.

In accordance with one form of the invention, and as illustrated in FIGS. 1–7, the open-ended projections 24 defining nozzles have formed as an integral part thereof an extension 25, shown in the form of a tapered tubular protrusion which facilitates directing the wash water into streams.

By locating the respective nozzles in a regular grid-like arrangement on the upper surface of the underdrain units, it will be seen that the pairs of nozzles located between immediately adjacent peaks 22 are arranged in cooperating relationship with the axes of the fluid passageways thereof intersecting each other at a point outside of and adjacent the underdrain unit. Thus, the streams of wash water issuing from the cooperating pairs of nozzles during backwashing are directed diagonally upwardly into impingement with each other at a point between and preferably below the level of immediately adjacent peaks 22 on the upper wall 21. It can be seen that by locating the nozzles on the upper wall intermediate the peaks 22 and valleys 23 thereof, the nozzles are shieldingly protected from accidental breakage or damage during installation by the adjacent peaks. The outermost rows of nozzles on the upper wall adjacent the side walls of the underdrain unit are oriented angularly upwardly and either cooperate with the corresponding nozzles on adjacent underdrain units or direct the streams of water therefrom toward the side wall of the filter basin to provide uniform wash water distribution adjacent the side walls 11 of the filter.

Each of the opposing side walls 27, 28 of the underdrain unit 20 is provided with a uniform grid-like arrangement of nozzles over substantially the entire surface thereof which, as is more fully described later, serve both to secure the underdrain units together as installed and to increase wash water distribution. The bottom wall 31 is substantially flat and has a plurality of perforations 32 provided therethrough. These perforations serve to help secure the underdrain to the floor of the filter basin by engaging with grouting material provided under the underdrain units, and also serve to allow liquids to pass therethrough into an underlying recessed flume. As shown in FIGS. 2 and 3 bottom wall 31 extends outwardly beyond the side walls 27, 28 to define a flange 33 along the bottom side edges of the underdrain units which also helps to secure the underdrain unit to the floor.

Since the underdrain units of the present invention are adapted to be positioned in abutting relation to form a filter underdrain system, one or both of the ends of the underdrain units are provided with an opening such as that illustrated in FIGS. 2 and 3. The opening preferably comprises the major cross-sectional area of the end of the underdrain unit so as to provide a substantial path of flow for fluids between adjacent underdrain units.

Figures 4, 5, 6:
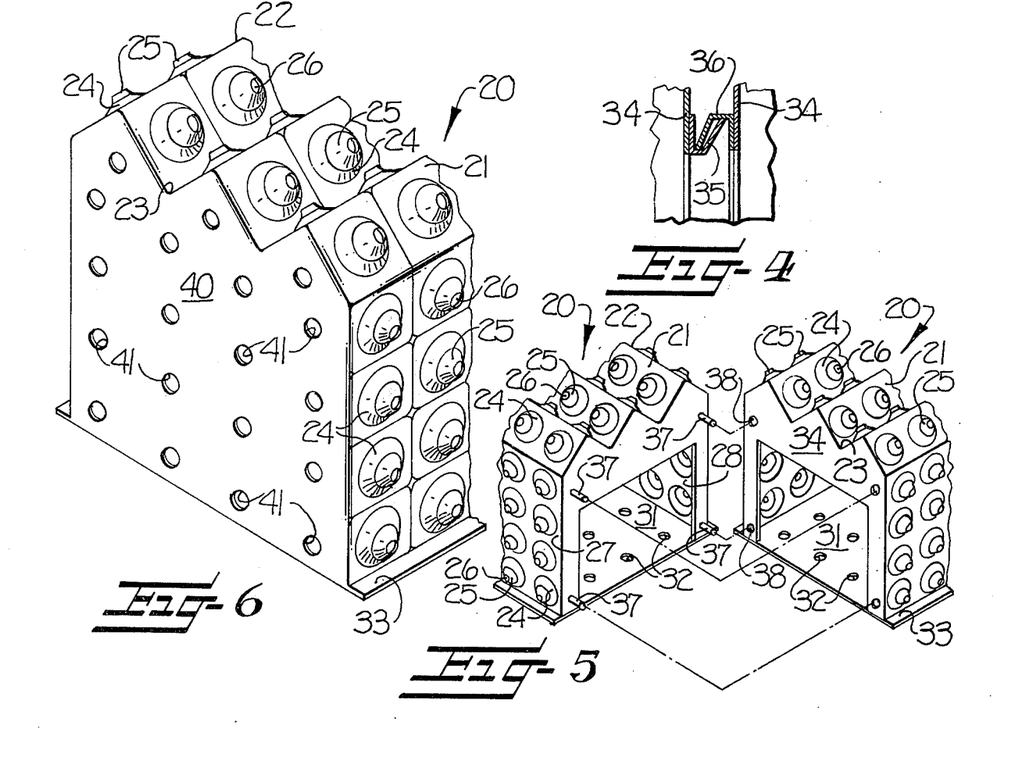
FIG. 4 is a detailed sectional view of the mating flanges shown in interlocking relationship.
FIG. 5 is a partial isometric view of a pair of underdrain units adapted for being positioned in end-to-end relation and showing the alignment pins and cooperating holes in the end walls thereof for facilitating positioning the units in alignment.
FIG. 6 is a partial isometric view of an underdrain unit having perforations in the end wall thereof.

To assist in properly aligning the underdrain units in end-to-end relation and to connect the units together, mating interlocking flanges 35, 36 (FIGS. 2 and 3) are preferably provided at the ends of the underdrain units adjacent the openings in end walls 34. As illustrated in FIGS. 2 and 3, outwardly extending flange 35 and inwardly extending flange 36 have portions thereof broken away to show the cross-section of the respective flanges. FIG. 4 illustrates the manner in which complementary flanges 35, 36 interlock.

FIG. 5 illustrates an alternative form of the present invention wherein pins 37 are provided in one end wall of the filter underdrain unit and mating holes 38 are provided in the complementary end wall of another underdrain unit. The pins 37 and holes 38 serve to facilitate positioning the filter underdrain units in proper alignment in end-to-end abutting relation.

For use as an end unit of a row of interconnected underdrain units, the underdrain is provided with an opening in only one end thereof, with the opposite end wall being substantially solid and preferably formed as illustrated in FIG. 6. In this embodiment, the substantially solid end wall 40 is provided with a plurality of perforations 41 over the surface thereof. The lower perforations serve to provide mechanical engagement with the grouting material provided around the units, with the upper perforations being left uncovered by grouting material and serving as additional flow passageways for distribution of wash water against the walls of the filter basin.

Referring now to the arrangement of underdrain units as installed in a filter underdrain system in accordance with one form of the present invention, reference is again made to FIG. 1. In the arrangement illustrated, the underdrain units are arranged end-to-end in parallel spaced rows and cover substantially the entire floor of the filter basin. Recessed flume 12 extends transversely of each row of underdrain units and communicates with the interior of each row through perforations 32 in the lower wall of the underdrain unit overlying the recessed flume. During the backwashing operation, the perforations 32 help to equalize the water pressure in each row of underdrain units and to distribute the wash water uniformly into each row.

Figure 7:
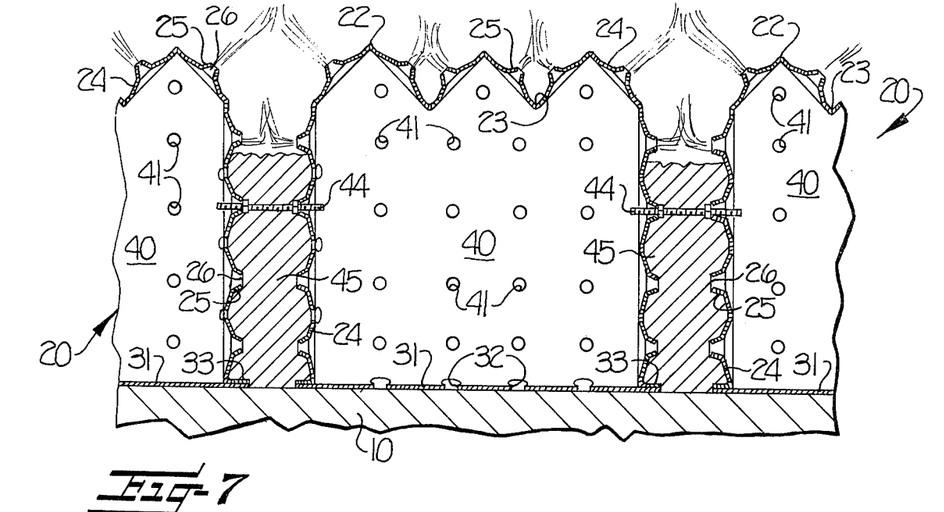
FIG. 7 is a vertical sectional view of a series of spaced parallel underdrain units as installed to form an underdrain, and showing the integral nozzles in accordance with one form of the invention.

In installing the underdrain units in the filter basin, the units are positioned in rows in end-to-end abutting relation with adjacent rows being spaced apart from each other by several inches. A threaded rod or bolt 44 with nuts provided thereon may be conveniently employed as illustrated in FIG. 7 to uniformly position the adjacent underdrain units in spaced apart relation. A grouting material 45 of cement or the like is then provided in the space between the adjacent underdrain units to a depth of about two-thirds to three-fourths of the height of the underdrain unit. Preferably, at least the uppermost row of nozzles in the side wall of the filter underdrain unit is left uncovered by the grouting material. The flange 33 and lower projections 24 on the sides of the filter underdrain units thus provide mechanical engagement between the grouting material and the underdrain units to securely hold the underdrain units in place on the floor of the filter basin. By leaving the uppermost row of nozzles uncovered by the grouting material, additional locations are provided for receiving filtered water into the underdrain units. In addition, correspondingly located nozzles in adjacent underdrain units cooperate with each other during backwashing to direct the streams of wash water issuing therefrom in a substantially horizontal direction and into impingement with each other between the adjacent underdrain units. Thus, additional distribution of wash water is provided for more thoroughly washing the overlying bed of filter media.

Figure 8:
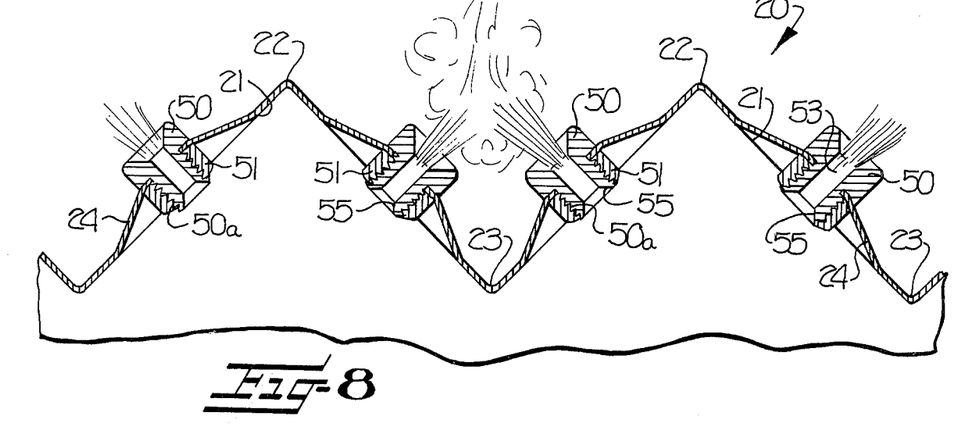
FIG. 8 is a detailed vertical sectional view of the upper wall of an underdrain unit having replaceable nozzle inserts provided therein in accordance with a second form of the invention.
Figures 9, 10, 11:
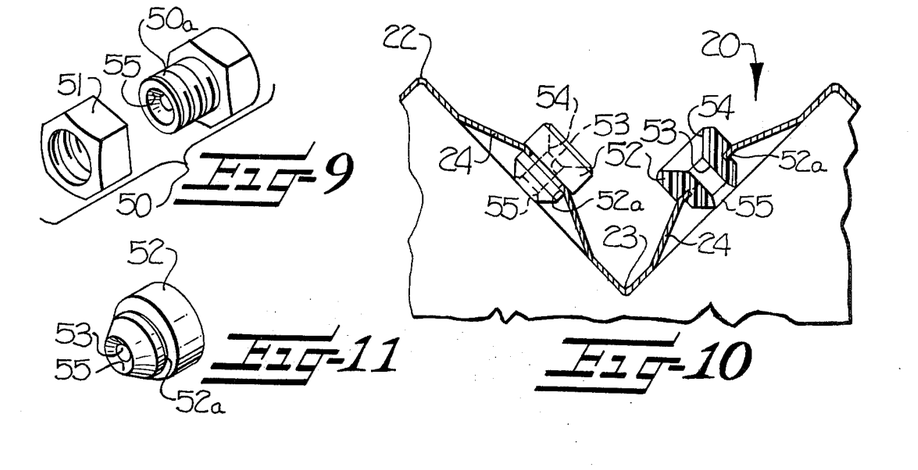
FIG. 9 is a detailed isometric view of one of the replaceable nozzle inserts shown in FIG. 8.
FIG. 10 is a detailed vertical sectional view of the upper wall of an underdrain unit having replaceable nozzle inserts provided therein, and showing a second type of replaceable nozzle insert in accordance with the invention.
FIG. 11 is a detailed isometric view of one of the replaceable nozzle inserts of FIG. 10.

A further modification of the invention is illustrated in FIG. 8, wherein the nozzles in the upper wall of the underdrain unit are provided with separate replaceable nozzle inserts rather than being provided with integrally formed extensions thereon. This provides flexibility in that the particular size of fluid passageway for the nozzles underdrain unit may be selected as the specifications of a particular filter installation dictate. Two forms of the replaceable type nozzle inserts are illustrated. As shown in FIGS. 8 and 9, nozzle insert 50 has a threaded shank 50a, with a retaining nut 51 being adapted for threading thereon. The nozzle insert may thus be fastened in the upper wall of the underdrain secure from being dislodged from its seat under the high pressures of the backwash operation. In the second form as illustrated in FIGS. 10 and 11, the nozzle inserts 52 are made of a resilient material such as plastic and have an annular groove to slot 52a formed therein to retain the nozzle insert in the upper wall of the filter underdrain. In both embodiments, the nozzle has a cylindrical bore 53 through the central portion thereof defining a restricted fluid passageway. The outer end of each nozzle insert has a concave surface 54 thereon which serves to funnel filtered water into the fluid passageway of the nozzle insert during filtration to facilitate the flow therethrough. A concave surface 55 is also preferably provided on the inner end of the nozzle insert to funnel the wash water into the nozzle insert during backwashing to facilitate the flow therethrough and reduce the head loss during backwashing. The replaceable nozzle inserts 50 or 52 are located on each one of the projections 24 on the upper wall of the underdrain units, and also on those projections in the side wall of the underdrain units which are exposed above the level of the grouting material between adjacent underdrain units. Preferably, the replaceable nozzle inserts are also provided in the upper portion of the substantially solid end walls such as the end wall 40 of FIG. 6. As illustrated in FIG. 6, the replaceable nozzle inserts would be provided only in the upper two rows since the lower three illustrated rows would be positioned below the level of the grouting material.

Figures 12, 13, 15:
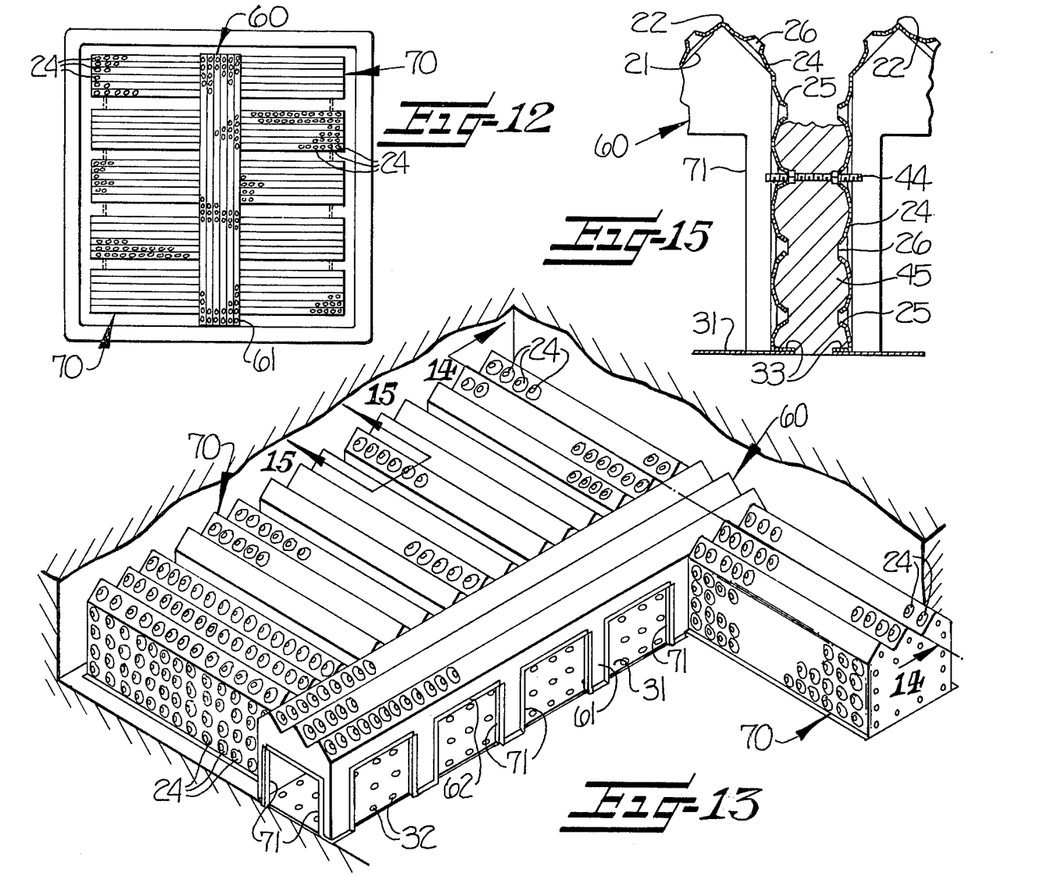
FIG. 12 is a plan view of a second type of filter underdrain system in accordance with the present invention.
FIG. 13 is a more detailed isometric view of the filter underdrain system of FIG. 12.
FIG. 15 is a vertical sectional view taken substantially along line 15—15 of FIG. 13.
Figure 14:
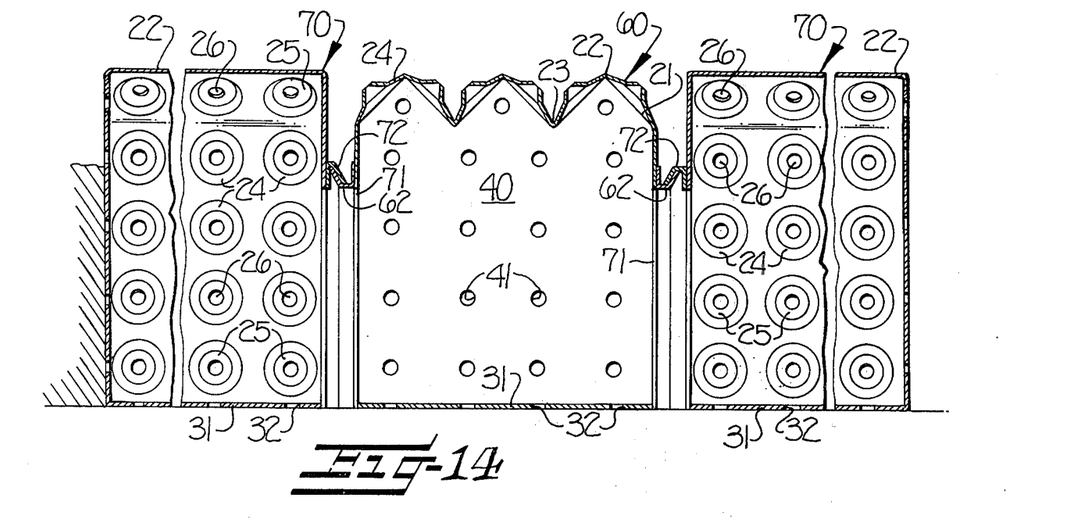
FIG. 14 is a vertical sectional view taken substantially along line 14—14 of FIG. 13.

FIGS. 12–15 illustrate an alternative form of the invention wherein the underdrain units are positioned in a different arrangement than that previously described, but wherein the underdrain units are similar in many respects to those previously described. Accordingly, those parts shown in FIGS. 12–14 which correspond to similar parts in FIGS. 1–11 will bear the same reference characters to avoid repetitive description. Essentially this modified form of the invention differs from the first form in that a longitudinal flume is provided in the underdrain system itself. Accordingly, the filter basin in which the underdrain system of FIGS. 12 and 13 is installed does not require a recessed flume therein such as the recessed flume 12 of FIG. 1. This form of the invention is particularly suited for rehabilitating existing water filtration systems where the existing structure is not provided with a recessed flume or where the existing flume is improperly sized or is otherwise unsuitable.

In accordance with this embodiment of the invention, the underdrain system includes an elongate flume unit 60 extending longitudinally across the floor of the filter basin substantially in the center thereof, and a plurality of elongate lateral units 70 arranged in spaced parallel rows on each side of the flume unit 60 with one end of each lateral unit abutting a side wall 61 of the flume unit 60. Each side wall 61 of flume unit 60 is provided with a series of relatively large openings therein. As illustrated, each of the openings in side wall 61 corresponds in size with the opening in an end wall 71 of the lateral unit, with the combined area of the side walls 61 comprising the major area of the side walls of the flume unit. Thus, fluid communication is provided between the interior of the lateral units and the respective flume unit. Outwardly extending flanges 62 of the type previously described are provided adjacent each of the side openings in the side wall 61 of the flume units with complementary inwardly extending flanges 72 being provided adjacent the opening in end wall 71 of the lateral units for connecting the units together in interlocking relation. As illustrated, each lateral is formed by a single lateral unit 70. It will be apparent, however, that if a longer expanse is desired for each lateral, a series of end-to-end abutting underdrain units may be provided instead.

Referring now to FIG. 15, the underdrain units in this form of the invention are secured together and to the floor of the filter basin by grouting material 45 which is provided between, and if desired, also beneath the underdrain units to secure the same together and to the floor of the filter basin. Also, as in the previous embodiment a threaded rod or bolt 44 is conveniently employed to position the lateral units in uniform spaced apart relation.

It can be seen from the foregoing that the present invention provides an improved underdrain system for a water filtration system which provides for economical and efficient filter operation and which has further advantages over the underdrain systems presently known.

In the drawings and specification, there have been set forth preferred embodiments of the invention, and although specific terms are employed, they are used in a generic and descriptive sense only and not for purposes of limitation.

That which is claimed is:

1. A water filtration system comprising a filter basin having a supporting floor and side walls extending upwardly around the perimeter of the floor, an underdrain carried by said supporting floor and covering substantially the entire area thereof, and a bed of filter media positioned in said filter basin overlying said underdrain, said underdrain comprising a plurality of elongate hollow underdrain units each having an elongate substantially horizontal fluid passageway therein, said underdrain units being arranged with their fluid passageways in fluid communication with each other and forming a network of horizontal fluid passageways beneath said bed of filter media, each underdrain unit having an upper wall along its length defining the upper portion of the elongate fluid passageway therein, and a plurality of nozzles provided in said upper wall with each of said nozzles defining a restricted fluid passageway extending along a substantially straight path through said upper wall and communicating with said elongate fluid passageway, most of said nozzles in the upper wall of each underdrain unit cooperating with each other and being arranged in spaced groups with the axes of the fluid passageways of the cooperating nozzles in each group being oriented diagonally upwardly and convergingly intersecting each other in such a manner at a point outside of and closely adjacent the underdrain unit so that the cooperating nozzles direct streams of wash water issuing therefrom during backwashing diagonally upwardly into impingement with each other for dispersing the streams of wash water and reducing the force thereof, and the remaining nozzles of said plurality of nozzles in said upper wall being located to direct streams of wash water laterally of the underdrain unit.

2. A water filtration system according to claim 1 wherein each of said spaced groups of cooperating nozzles comprises a pair of nozzles, with corresponding nozzles of each pair being arranged in adjacent rows, and with the rows extending longitudinally of the elongate underdrain unit.

3. A water filtration system according to claim 2 wherein the upper wall of each of said underdrain units is formed with a series of longitudinally extending peaks and valleys on the exterior surface thereof, and wherein the cooperating nozzles are located intermediate the peaks and valleys of said upper wall and on opposite sides of a common valley.

4. A water filtration system according to claim 1 wherein said plurality of elongate underdrain units are arranged in a series of parallel adajcent rows, with each row comprising a series of elongate underdrain units positioned end-to-end with the elongate fluid passageways thereof being in fluid communication to define an elongate composite fluid passageway in each row, and wherein said water filtration system further comprises a recessed flume provided in the floor of said filter basin extending transversely of each of said elongate composite fluid passageways of the rows and in fluid communication therewith.

5. A water filtration system according to claim 4 wherein the end-to-end elongate underdrain units are provided along respective adjacent ends thereof with cooperating alignment means for facilitating positioning the end-to-end underdrain units in alignment with each other.

6. A water filtration system according to claim 4 wherein the end-to-end elongate underdrain units in each row are provided along respective adjacent ends thereof with complementary inwardly and outwardly extending flanges, said flanges being positioned in mating relation and serving to interconnect the end-to-end underdrain units and position the same in alignment with each other.

7. A water filtration system according to claim 1 wherein said plurality of elongate underdrain units include an elongate flume unit extending along the floor of the filter basin and a plurality of elongate lateral units arranged in parallel rows oriented perpendicular to said flume unit, and in fluid communication therewith.

8. A water filtration system according to claim 7 wherein said elongate flume unit is provided with a plurality of outwardly extending flanges along the sides thereof and wherein each of said elongate lateral units is provided with a complementary inwardly extending flange along one end thereof, each of said lateral units being arranged with the inwardly extending flange thereof in mating engagement with an outwardly extending flange on said flume unit to thereby interconnect the flume and lateral units and to provide fluid communication therebetween.

9. A water filtration system according to claim 1 wherein some of the underdrain units comprising said underdrain are located alongside at least one side wall of said filter basin and have some of the nozzles in the upper wall thereof positioned with the respective fluid passageways thereof oriented toward said one side wall and being thereby adapted for directing streams of wash water issuing therefrom during backwashing toward said one side wall for increasing the distribution of wash water in the bed of filter media during backwashing.

10. A water filtration system comprising a filter basin having a supporting floor and side walls extending upwardly around the perimeter of the floor, an underdrain carried by said supporting floor and covering substantially the entire area thereof, and a bed of filter media positioned in said filter basin overlying said underdrain, said underdrain comprising a plurality of elongate hollow underdrain units each having an elongate substantially horizontal fluid passageway therein, said underdrain units being arranged with their fluid passageways in fluid communication with each other and forming a network of horizontal fluid passageways beneath said bed of filter media, each underdrain unit having a lower wall resting on said supporting floor, an upper wall having said bed of filter media positioned thereon, a pair of opposing side walls interconnecting said upper and lower walls and defining said elongate substantially horizontal fluid passageway, and a plurality of nozzles provided in said upper wall with each of said nozzles defining a restricted fluid passageway extending along a substantially straight path through said upper wall and communicating with the interior of said underdrain unit, most of the nozzles in each underdrain unit being arranged in spaced cooperating pairs with the axes of the fluid passageways of respective cooperating pairs of nozzles being oriented diagonally upwardly and convergingly intersecting each other in such a manner at a point outside of and closely adjacent the underdrain unit so that the cooperating pairs of nozzles direct streams of wash water issuing therefrom during backwashing diagonally upwardly into impingement with each other for dispersing the streams of wash water and reducing the force thereof and the remaining nozzles of said plurality of nozzles in said upper wall being located to direct streams of wash water laterally of the underdrain unit and wherein some of said remaining nozzles cooperate with corresponding nozzles of adjacent underdrain units to direct streams of wash water issuing therefrom into impingement with each other.

11. A water filtration system according to claim 10 wherein the majority of said elongate underdrain units are arranged in spaced parallel relation and wherein a grouting material is provided between adjacent spaced underdrain units for securing the same together and to said supporting floor.

12. A water filtration system according to claim 11 wherein the level of said grouting material is below the upper edges of the side walls of said spaced underdrain units and wherein a plurality of nozzles are provided in the upper portion of each of said side walls above said grouting material, with the nozzles in immediately adjacent side walls cooperating with each other in paired relation, each of said nozzles defining a restricted fluid passageway through the respective side wall communicating with the interior of the respective underdrain unit, and the axes of the fluid passageways of the cooperating pairs of nozzles extending substantially horizontally and intersecting each other at a point between adjacent underdrain units for directing streams of wash water issuing therefrom during backwashing into impingement with each other between the adjacent underdrain units for dispersing the streams of wash water and reducing the force thereof and for thereby increasing the distribution of wash water in the bed of filter media during backwashing.

13. A water filtration system according to claim 11 wherein the bottom wall of each of said underdrain units extends laterally beyond the side walls thereof to define outwardly extending flanges along the bottom side edges of the underdrain units, and wherein the side walls of each of said underdrain units have a plurality of outward projections thereon, said grouting material between adjacent underdrain units engaging said flanges and at least some of said projections for facilitating securing the underdrain units together and to said floor.

14. A water filtration system according to claim 13 wherein grouting material is additionally provided beneath said underdrain units and wherein the lower wall and side walls of said underdrain units are provided with a plurality of perforations therein, with the perforations in said side walls being located on said outward projections, the perforations in said lower and side walls thereby being adapted for facilitating engagement of the underdrain units by said grouting material for securing the underdrain units together and to said floor.

15. An underdrain unit for a water filtration system comprising an elongate hollow member defining an elongate substantially horizontal fluid passageway therein, said elongate member having an upper wall along its length defining the upper portion of said elongate fluid passageway, and a plurality of nozzles provided in said upper wall with each of said nozzles defining a restricted fluid passageway extending along a substantially straight path through said upper wall and communicating with the interior of said elongate hollow member, most of said nozzles cooperating with each other and being arranged in spaced groups with the axes of the fluid passageways of the cooperating nozzles in each group being oriented diagonally upwardly and convergingly intersecting each other in such a manner at a point outside of and closely adjacent the elongate hollow member so that the cooperating nozzles direct streams of wash water issuing therefrom during backwashing diagonally upwardly into impingement with each other for dispersing the streams of wash water and reducing the force thereof, and the remaining nozzles of said plurality of nozzles in said upper wall being located to direct streams of wash water laterally of the underdrain unit.

16. An underdrain unit according to claim 15 wherein each of said spaced groups of cooperating nozzles comprise a pair of nozzles, and wherein the axes of the fluid passageways of cooperating pairs of nozzles intersect each other at a point substantially equidistant from each nozzle of the pair.

17. An underdrain unit according to claim 15 wherein each of said spaced groups of cooperating nozzles comprises a pair of nozzles, with corresponding nozzles of each pair being arranged in adjacent rows, and with the rows extending longitudinally of the elongate hollow member.

18. An underdrain unit according to claim 15 wherein each of said nozzles comprises a tubular protrusion formed integrally with the nozzle and serving as an extension thereof.

19. An underdrain unit according to claim 15 wherein each of said nozzles comprises an insert extending through said upper wall and being secured thereto, and having a bore extending therethrough serving as said restricted fluid passageway.

20. An underdrain unit according to claim 19 wherein the outer end of each of said nozzle inserts has a concave surface thereon communicating with the bore through the insert for funneling filtered water therethrough during filtration.

21. An underdrain unit according to claim 15 wherein the nozzles in said upper wall have tapered inner surfaces which serve for funneling wash water into the restricted fluid passageways of the nozzles to facilitate the flow therethrough during backwashing.

22. An underdrain unit according to claim 15 having alignment means provided at at least one end of said elongate hollow member for facilitating positioning the underdrain unit in alignment in end-to-end relation with at least one other underdrain unit.

23. An underdrain unit according to claim 15 having a pair of complementary flanges provided along opposite ends of said elongate hollow member, the flange at one end of the hollow member being turned outwardly and the flange at the opposite end of the hollow member being turned inwardly and adapted for matingly engaging a complementary outwardly turned flange of another underdrain unit and providing an interlocking connection therebetween, the underdrain unit being thereby adapted for serving as an intermediate unit in a filter underdrain.

24. An underdrain unit according to claim 15 having a perforated end wall provided at one end of said elongate hollow member and having an inwardly turned flange provided along the opposite end of said elongate hollow member, with said inwardly turned flange being adapted for matingly engaging a complementary outwardly turned flange of an adjacent underdrain unit and providing an interlocking connection therebetween, the underdrain unit being thereby adapted for serving as an end unit in a filter underdrain.

25. An underdrain unit for a water filtration system comprising an elongate hollow member defining an elongate substantially horizontal fluid passageway therein, said elongate member having an upper wall along its length defining the upper portion of said elongate fluid passageway and being formed with a series of longitudinally extending substantially parallel peaks and intervening valleys on the exterior surface thereof, and a plurality of nozzles provided in said upper wall with each of said nozzles defining a restricted fluid passageway through said upper wall communicating with the interior of said elongate hollow member, most of said nozzles being arranged in longitudinally extending pairs of rows with the nozzles in the respective rows being spaced apart from each other, each pair of rows being located between immediately adjacent peaks with one row of each pair being located on the opposite side of the intervening valley from the other row of the pair, and with the nozzles of one row of each pair cooperating with the nozzles in the other row of each pair to define cooperating pairs of nozzles, the fluid passageways of respective cooperating pairs of nozzles being oriented with their axes extending diagonally upwardly and intersecting each other in such a manner at a location outside of and closely adjacent the upper wall so that the cooperating nozzles direct streams of wash water issuing therefrom during backwashing diagonally upwardly into impingement with each other for dispersing the stream of wash water and reducing the force thereof, and the remaining nozzles of said plurality of nozzles in said upper wall being located to direct streams of wash water laterally of the underdrain unit.

26. An underdrain unit according to claim 25 wherein the axes of the fluid passageways of cooperating pairs of nozzles intersect each other at a point substantially equidistant from each nozzle of the pair and below the level of the immediately adjacent peaks.

27. An underdrain unit according to claim 25 wherein said upper wall is of substantially uniform thickness and wherein the longitudinally extending peaks and valleys on the exterior surface of said upper wall respectively form corresponding longitudinally extending valleys and peaks on the interior surface of said upper wall.

28. An underdrain unit according to claim 27 wherein said plurality of nozzles in said upper wall are in the form of spaced projections extending outwardly from said upper wall and having tapered inner surfaces for funneling wash water into the fluid passageways of the nozzles to facilitate the flow therethrough during backwashing.

29. An underdrain unit for a water filtration system comprising an elongate hollow member defining an elongate substantially horizontal fluid passageway therein, said elongate member having a lower wall adapted for supporting the elongate hollow member on a substrate, a corrugated upper wall adapted for having a bed of filter media positioned thereon, a pair of opposing side walls interconnecting said upper and lower walls and defining said elongate substantially horizontal fluid passageway, and a plurality of nozzles provided in said corrugated upper wall with each of said nozzles defining a restricted fluid passageway extending along a substantially straight path through said upper wall and communicating with the interior of said elongate hollow member, most of said nozzles being arranged in spaced cooperating pairs with the axes of the fluid passageways of respective cooperating pairs of nozzles being oriented diagonally upwardly and convergingly intersecting each other in such a manner at a point outside of and closely adjacent the elongate hollow member so that the cooperating pairs of nozzles direct streams of wash water issuing therefrom diagonally upwardly during backwashing into impingement with each other for dispersing the streams of wash water and reducing the force thereof, and the remaining nozzles of said plurality of nozzles in said upper wall being located to direct streams of wash water laterally of the underdrain unit.

30. An underdrain unit according to claim 29 additionally comprising a plurality of nozzles provided in the upper portion of each of said side walls with each of said nozzles defining a restricted fluid passageway extending through the side wall and communicating with the interior of said elongate hollow member.

31. An underdrain unit according to claim 29 wherein said side walls and said bottom wall include a plurality of perforations therein communicating with said elongate substantially horizontal fluid passageway and being adapted for facilitating securement of the underdrain unit in a filter underdrain.

32. An underdrain unit according to claim 29 additionally comprising a pair of end walls interconnecting said upper and lower walls and said opposing side walls, each of said end walls having a large opening therein over the major area of the end wall for permitting the flow of fluids therethrough into and out of said elongate substantially horizontal fluid passageway.

33. An underdrain unit according to claim 29 additionally comprising a pair of end walls interconnecting said upper and lower walls and said opposing side walls, one of said end walls having a large opening therein over the major area of the end wall for permitting the flow of fluids therethrough into and out of said elongate substantially horizontal fluid passageway, the other end wall having a plurality of perforations therein and being adapted for facilitating securement of the underdrain unit in a filter underdrain.

34. An underdrain unit according to claim 29 wherein each of said side walls includes a plurality of large openings therein, with the combined area of the openings in each side wall comprising the major area of the side wall, said openings being adapted for permitting the flow of fluids therethrough into and out of said elongate substantially horizontal fluid passageway.

35. An underdrain unit for a water filtration system comprising an elongate hollow member of thin wall construction having respective upper and lower walls along its length and a pair of opposing side walls interconnecting the upper and lower walls and defining an elongate substantially horizontal fluid passageway within said hollow member, said upper wall being corrugated and defining a series of longitudinally extending substantially parallel peaks and intervening valleys, the volume of the fluid passageway within said hollow member being many times greater than the volume collectively defined within said hollow member between the peaks and valleys of said upper wall, and a plurality of nozzles provided in said upper wall with each of said nozzles defining a restricted fluid passageway through said upper wall communicating with the interior of said elongate hollow member, most of said nozzles being arranged in spaced cooperating pairs with the axes of the fluid passageways of respective cooperating pairs of nozzles being oriented diagonally upwardly and convergingly intersecting each other in such a manner at a point outside of and closely adjacent the elongate hollow member so that the cooperating pairs of nozzles direct streams of wash water issuing therefrom during backwashing diagonally upwardly into impingement with each other for dispersing the streams of wash water and reducing the force thereof, and the remaining nozzles of said plurality of nozzles in said upper wall being located to direct streams of wash water laterally of the underdrain unit.

* * * * *